(12) United States Patent  
Magarill (10) Patent No.: US 7,410,261 B2
(45) Date of Patent: Aug. 12, 2008

(54) MULTICOLOR ILLUMINATOR SYSTEM (75) Inventor: Simon Magarill, Cincinnati, OH (US)

(73) Assignee: 3M Innovative Properties Company, St. Paul, MN (US)

(*) Notice: Subject to any disclaimer, the term of this patent is extended or adjusted under 35 U.S.C. 154(b) by 379 days.

(21) Appl. No.: 11/133,816

(22) Filed: May 20, 2005

(65) Prior Publication Data

US 2006/0262282 A1 Nov. 23, 2006

(51) Int. Cl.
G03B 21/00 (2006.01)
G03B 21/28 (2006.01)
G03B 21/26 (2006.01)
H04N 9/12 (2006.01)
H04N 5/64 (2006.01)

(52) U.S. Cl. ............... 353/33; 353/81; 353/94; 348/742; 348/744

(58) Field of Classification Search ......... 353/7, 353/8, 29–34, 37, 48, 81, 84–87, 94, 122; 349/5, 8–10, 15; 348/742–744, 750, 751, 348/754, 757

See application file for complete search history.

(56) References Cited

U.S. PATENT DOCUMENTS

| 2,403,731 | A | 7/1946 | MacNeille |
| 4,221,464 | A | 9/1980 | Pedinoff et al. |
| 6,108,131 | A | 8/2000 | Hansen et al. |
| 6,609,795 | B2 | 8/2003 | Weber et al. |
| 6,648,475 | B1* | 11/2003 | Roddy et al. ............ 353/31 |
| 6,672,721 | B2 | 1/2004 | Aastuen et al. |
| 6,726,329 | B2 | 4/2004 | Li et al. |
| 6,769,772 | B2* | 8/2004 | Roddy et al. ............ 353/31 |
| 6,786,604 | B2 | 9/2004 | Aastuen et al. |
| 6,870,523 | B1 | 3/2005 | Ben-Davis et al. |
| 7,001,022 | B2 | 2/2006 | Kim et al. |
| 7,088,321 | B1 | 8/2006 | Parker |
| 2003/0063389 | A1 | 4/2003 | Koyama |
| 2003/0133080 | A1 | 7/2003 | Ogawa et al. |
| 2003/0202157 | A1 | 10/2003 | Pentico et al. |
| 2004/0006665 | A1 | 1/2004 | Moss |
| 2004/0130682 | A1 | 7/2004 | Tomita |
| 2004/0130784 | A1 | 7/2004 | Williams et al. |
| 2004/0136067 | A1 | 7/2004 | Chen et al. |

(Continued)

FOREIGN PATENT DOCUMENTS

EP 1 043 620 10/2000

(Continued)

OTHER PUBLICATIONS

U.S. Appl. No. 10/895,705, filed Jul. 21, 2004 entitled "Projection System with Scrolling Color Illumination".

(Continued)

Primary Examiner—Melissa Jan Koval (57) ABSTRACT

In an image projection system, there are at least two light illumination units producing illumination light beams of respective first and second primary colors. A first beamsplitter is disposed to split at least a portion of the first illumination light beam into sub-beams, one of which is directed to a first image-forming panel. The other sub-beam is combined with at least some of the second illumination light beam to form a light beam of mixed light that illuminates the image-forming panel. In some embodiments, the first beamsplitter is a polarizing beamsplitter.

35 Claims, 6 Drawing Sheets

U.S. PATENT DOCUMENTS

| | | |
|---|---|---|
| 2004/0189956 A1 | 9/2004 | Kanayama et al. |
| 2004/0207820 A1 | 10/2004 | Roddy et al. |
| 2004/0263500 A1 | 12/2004 | Sakata |
| 2005/0001938 A1 | 1/2005 | Koba |
| 2005/0018141 A1 | 1/2005 | Hosaka |
| 2005/0110955 A1 | 5/2005 | Trollsch et al. |

FOREIGN PATENT DOCUMENTS

| | | |
|---|---|---|
| EP | 1 489 854 A2 | 12/2004 |
| EP | 1 662 804 A1 | 5/2006 |
| WO | WO01/43113 | 6/2001 |
| WO | WO 01/43113 A1 | 6/2001 |
| WO | WO03/088203 | 10/2003 |
| WO | WO2004/010407 | 1/2004 |
| WO | WO 2004/043076 A2 | 5/2004 |
| WO | WO 2004/114003 A1 | 12/2004 |
| WO | WO2005/013193 | 2/2005 |

OTHER PUBLICATIONS

U.S. Appl. No. 10/914,596, filed Aug. 9, 2004 entitled "Projection Display System Using Multiple Light Sources and Polarizing Element for Using with Same".

U.S. Appl. No. 10/923,945, filed Aug. 23, 2004 entitled "Multiple Channel Illumination System".

U.S. Appl. No. 11/025,285, filed Dec. 29, 2004 entitled "Illumination System Using Multiple Light Sources with Integrating Tunnel and Projection Systems Using Same".

U.S. Appl. No. 11/094,671, filed Mar. 30, 2005 entitled "Illumination System and Projection System Using Same".

Keuper, et al., "RGB LED Illuminator for Pocket-Sized Projectors", *SID 04 Digest*, 2004 pp. 943-945.

Priest, et al., "The Minimum Perceptible Colorimetric Purity as a Function of Dominant Wave-Length", Journal of the Optical Society of America, vol. 28, No. 5, May 1989, pp. 133-139.

\* cited by examiner

MULTICOLOR ILLUMINATOR SYSTEM

FIELD OF THE INVENTION

The present invention relates to illumination systems that may be used in image projection systems, and projection systems using those systems. More specifically, the invention relates to illumination systems that include an array of light emitting elements, such as light emitting diodes (LEDs) to generate light.

BACKGROUND

Illumination systems may be found in many different applications, including image projection display systems, backlights for liquid crystal displays and the like. Projection systems usually use a source of light, illumination optics to pass the light to one or more image-forming devices, projection optics to project the image(s) from the image-forming device(s) and a projection screen on which the image is displayed. The image-forming device(s) are controlled by an electronically conditioned and processed video signal.

White light sources, such as high-pressure mercury lamps, have been, and still are, the predominant light sources used in projection display systems. In a three-panel image-projection system, the white light beam is split into three primary color channels, red, green and blue, and is directed to respective image-forming device panels that produce the image for each color. The resulting primary-colored image beams are combined into a full color image beam that is projected for display. Some other projection systems use a single imager panel, and so rotating color wheels, or some other type of time-sequential color filter, is used to filter the white light so that light at one primary color is incident on the image-display device at any one time. The light incident at the panel changes color sequentially to form colored images synchronously with the incident light. The viewer's eye integrates the sequentially colored images to perceive a full color image.

More recently, light emitting diodes (LEDs) have been considered as an alternative to white light sources. For a three panel system, an array of red LEDs is used to illuminate the red channel, an array of green LEDs is used for the green channel and an array of blue LEDs is used for the blue channel. Some advantages of using LED light sources include longer lifetime, higher efficiency and superior thermal characteristics.

LED-based illumination systems display a color gamut that is different from that recommended by the Society of Motion Picture and Television Engineers in Recommended Practices 145-1999, "C Color Monitor Colorimetry" (referred to hereafter as SMPTS 145-1999). Also, in order to achieve an acceptable white color, LED-based illumination sources are often run in a mode that fails to realize the full intensity available from all LEDs, so the overall brightness of the image is reduced.

SUMMARY OF THE INVENTION

One embodiment of the invention is directed to an optical system that includes at least a first image-forming panel, a first illumination light unit source capable of generating a first light beam of a first primary color and a second illumination light unit light source capable of generating a second light beam of a second primary color different from the first primary color. A first beamsplitter is disposed to split at least a portion of the first light beam into third and fourth beams of the first primary color. The third light beam is directed to the first image-forming panel. A first color combiner is disposed to combine at least some of the fourth light beam with at least some of the light of the second light beam to form a fifth light beam of mixed light of the first and second primary colors.

Another embodiment of the present invention is directed to a projection system that comprises a first illumination light unit capable of generating light of a first primary color and a first image-forming panel illuminated by at least some of the light of the first primary color. The system also includes a second illumination light unit capable of generating light of a second primary color and a second image-forming panel illuminated by at least some of the light of the second primary color, and includes a third illumination light unit capable of generating light of a third primary color and a third image-forming panel illuminated by at least some of the light of the third primary color. The system has a color separating unit arranged to separate at least some of the light of the second primary color as a separated beam, and has a color mixing unit arranged to mix the separated beam with at least one of the light of the first primary color and the light of the third primary color. At least one of the first and third image-forming panels is illuminated by light of the second primary color.

Another embodiment of the invention is directed to a projection system that has a first illumination light unit capable of generating light of a first primary color, a first image-forming panel, a second illumination light unit capable of generating light of a second primary color, a second image-forming panel at least some of the light of the second primary color illuminating the second image-forming panel, and a third illumination light unit capable of generating light of a third primary color. A first light splitting unit splits at least some of the light of the third primary color into first and second beams of the third primary color. A first color mixing unit combines at least some of the light of the first primary color and at least some of the light of the first beam of the third primary color to form a first mixed primary light beam, the first mixed primary light beam being directed to the first image-forming panel.

The above summary of the present invention is not intended to describe each illustrated embodiment or every implementation of the present invention. The following figures and detailed description more particularly exemplify these embodiments.

BRIEF DESCRIPTION OF THE DRAWINGS

The invention may be more completely understood in consideration of the following detailed description of various embodiments of the invention in connection with the accompanying drawings, in which.

Like numerals in different figures refer to similar elements. While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention as defined by the appended claims.

DETAILED DESCRIPTION

Light emitting diodes (LEDs) with higher output power are becoming more available, which opens up new applications for LED illumination. Some applications that may be addressed with high power LEDs include projection and display systems, illumination sources in machine vision systems and camera/video applications, and even in distance illumination systems such as car headlights. One application for which LEDs are particularly suitable is the illumination of image-forming devices in image-projection systems. Such projection systems may be used, for example, in projection televisions.

LEDs emit light over a wide angle and one of the challenges for the optical system designer is to efficiently collect the light produced by the LED and direct the light to the target area. Another challenge is to achieve a set of colors that produce a desired white color while illuminating the target with as bright a beam as possible.

Figure 1:
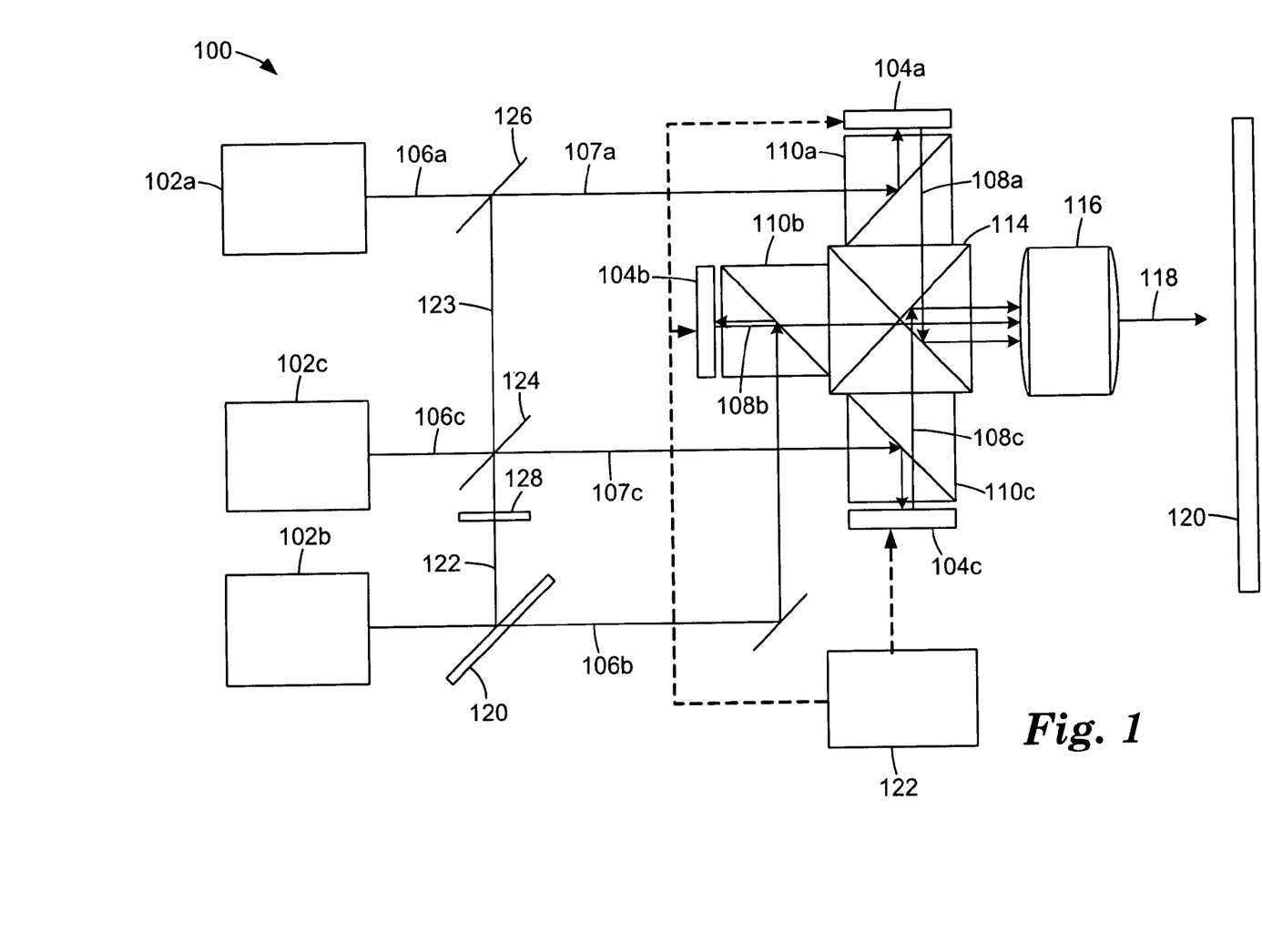
FIG. 1 schematically illustrates an exemplary embodiment of an image projection system, having color mixing of primary color light beams, according to principles of the present invention.

One embodiment of an image projection system 100 is schematically illustrated in FIG. 1. The system includes three illumination light units 102a, 102b, 102c that produce different primary colors. The illumination light units 102a, 102b, 102c include a plurality of light emitting diodes (LEDS), or similar types of light sources that generate light of one color. In the illustrated embodiment, for example, illumination light unit 102a generates red light, illumination light unit 102b generates green light and illumination light unit 102c generates blue light. The illumination light units 102a-102c also include beam handling optics that collect the light generated by the light sources and direct the illumination light as a light beam to respective image-forming panels 104a-104c.

The image-forming panels 104a-104c may be any suitable type of image-forming panel, such as a digital multimirror device (DMD) panel or a liquid crystal display (LCD) panel. In the case of an LCD panel, the image-forming panels 104a-104c may be reflective, for example a liquid-crystal-on-silicon (LCoS) panel, or transmissive, for example a high temperature polysilicon (HPTS) panel. The image-forming panels 104a-104c modulate colored image beams 108a-108c, each at the respective color with which the image-forming panel 104a-104c was illuminated. An image color combining element 114 may be used to combine the different colored image beams 108a-108c into a single, mixed image beam 118. In the illustrated embodiment, the image color combining element 114 is in the form of an x-cube combiner, although other form of color combiner may also be used. The mixed image beam 118 may then be projected to a screen 120 using a projection lens 116. A controller 122 may be used to provide control signals to the image-forming panels 104a-104c for controlling the image formed by the panels 104a-104c.

In the illustrated embodiment, the image-forming panels 104a-104c use polarization modulation to form the image beams, e.g. the image-forming panels 104a-104c are LCoS panels, so respective polarizing beamsplitters (PBSs) 110a-110c are positioned beside the image-forming panels 104a-104c to couple the illumination light beams 106a-106c to the panels 104a-104c and to couple the colored image beams 108a-108c away from the panels 104a-104c. A PBS transmits light in one polarization state and reflects light in the orthogonal polarization state. Thus, the illumination light beams 106a-106c may be reflected to the image-forming panels 104a-104c while the image light beams 108a-108c are transmitted through the PBSs 110a-110c, as in the configuration illustrated. In another configuration, not illustrated, the illumination light beams 106a-106c may be transmitted through the PBSs 110a-110c to the image-forming panels 104a-104c while the image light beams 108a-108c are reflected by the PBSs 110a-110c.

The PBSs 110a-110c may be any suitable type of PBS, for example a MacNeille PBS, a wire grid PBS or a multilayer optical film (MOF) PBS. In a MacNeille PBS, the light is incident at a stack of dielectric layers at Brewster's angle. Light in the p-polarization state is transmitted because of the low loss transmission at Brewster's angle. Light in the other polarization state is reflected by the layers. This type of PBS was originally described in U.S. Pat. No. 2,403,731, by MacNeille. In a wire grid polarizer the light is incident on an array of thin, parallel straight wires: light in one polarization state is transmitted through the wires while the other polarization state is reflected. The wire grid polarizer is described in greater detail in U.S. Pat. Nos. 4,221,464 and 6,108,131.

The MOF PBS typically employs a stack of polymer films disposed between two prisms. The stack of polymer films includes alternating layers of isotropic and birefringent polymers, with the refractive index of the isotropic layer being matched to a refractive index of the birefringent layer. The MOF PBS is described in greater detail, for example in U.S. Pat. Nos. 6,609,795; 6,672,721; 6,786,604; and U.S. Patent Publication 2004-0130784-A1, all of which are incorporated herein by reference.

Other elements may be present in the projection system 100, but are omitted from the illustration for clarity. For example, the projection system 100 may include retardation elements or polarization rotation elements to control the polarization of the light at various points within the system. Furthermore, there may be various beam steering elements, such as mirrors and prisms, for guiding the various light beams around the system, and there may be various lens systems for relaying light from the illumination light units 102a-102c to the image-forming panels 104a-104c.

Other arrangements of projection systems may include transmissive image-forming panels, for example as described in U.S. patent application Ser. No. 11/094,671. In addition, other types of projection systems use single panels or double panels, as is described further in U.S. patent application Ser. Nos. 10/895,705 and 10/914,596, both of which are incorporated by reference.

Figure 2:
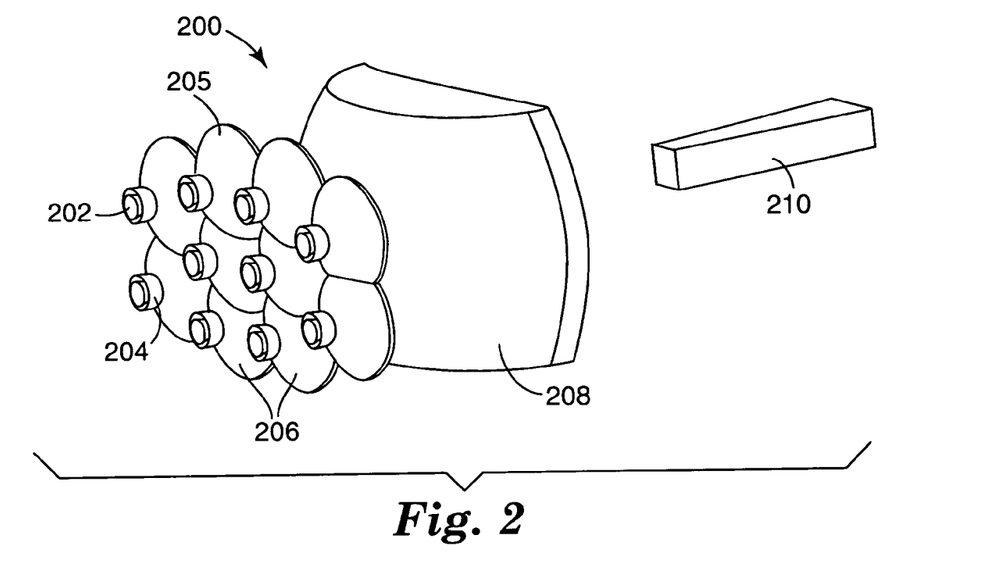
FIGS. 2 and 3 schematically illustrate respective perspective and top views of an exemplary embodiment of an illumination light unit that includes an array of light emitting diodes (LEDs)
Figure 3:
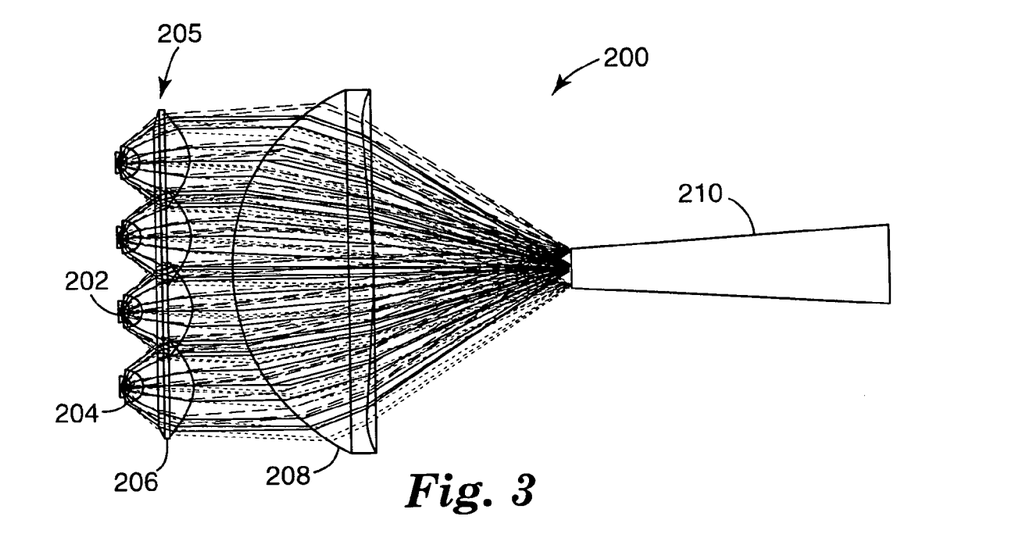

Many different arrangements may be used for the illumination light units 102a-102c. For example, the illumination light units may include refractive, reflective, or diffractive elements to gather and control the light emitted by the light sources, or some combination of these different types of elements. One exemplary embodiment of an illumination light unit 200 is schematically illustrated in FIGS. 2A and 2B. The illumination light unit 200 includes an array of LEDs 202, each LED having a respective first and second condensing lens 204, 206. Light from each of the second condensing lenses 206 is collected by a common focusing lens 208 and focused to the input of a reflecting integrator 210. The reflecting integrator 210 may be, for example, an internally reflecting integrator or a hollow tunnel integrator with reflecting sidewalls. The integrator 210 may have parallel sidewalls or tapered sidewalls. In many projection systems, an image of the output end of the integrator 210 is relayed to the respective image-forming panel 104a-104c by an image-relay system.

In some exemplary embodiments, the second condensing lenses 206 may be molded as a single sheet 205, and some of the individual lenses 206 may be truncated, in other words some of the individual lenses 206 are not circular.

Other configurations of illumination light unit may be used. For example, other types of illumination light units that use refractive elements for gathering the light are described in U.S. patent application Ser. No. 10/923,945, incorporated herein by reference. In addition, other exemplary types of illumination light units that use different combinations of refractive and reflective elements are described in U.S. patent application Ser. No. 11/025,285, incorporated herein by reference. Some additional exemplary embodiments of illumination light units that use different arrangements of multiple LEDs for illuminating an image-forming panel are discussed in U.S. patent application Ser. No. 10/923,945, incorporated herein by reference.

Illumination light units 102a-102c often generate light that is unpolarized, or contains light in orthogonal polarizations. In some embodiments, for example when the image-forming panel relies on polarization modulation to form the image, it is desired that the image-forming panels 104a-104c be illuminated with light in one polarization state. Accordingly, in conventional systems, the light in the other polarization state may be lost or may be converted into the desired polarization state.

The projection system 100 includes at least one color-mixing beamsplitter 120 in one of the color channels. The color-mixing beamsplitter 120 allows some of the light of a first color to pass to the image-forming panel 104b associated with the first color while also providing light of the first color to at least one light beam of another color. The color-mixing beamsplitter 120 may be, for example, a polarizing beamsplitter, so that the color-mixing beamsplitter 120 permits light 106b in a first polarization state to pass to the image-forming panel 104b. Light beam 122, in a second polarization state, orthogonal to the first polarization state is directed away from beam 106b. A color beam combiner 124, for example a dichroic beam mixer, may be used to mix part of the light in beam 122 with the light in beam 106c, to generate a mixed color beam 107c. Another color beam combiner 126 may be used to mix the light in beam 123 with the light in beam 106a, to generate a mixed color beam 107a. In such a case, the color beam combiner 124 may be configured to pass a portion of light beam 122 and reflect a portion of light beam 122. Color beam combiner 126 may reflect all of incident beam 123.

A polarization control unit 128 may optionally be used to control the polarization state of beam 122 incident at the first color beam combiner 124. The polarization control unit 128 may be, for example, a polarization rotator, a half-wave retardation plate, an arrangement of reflectors, or the like. Another polarization control unit (not shown) may optionally be used to control the polarization state of beam 123 incident at the second color beam combiner 126. A polarization control unit 128 may optionally be provided in the beam 106b directed to the second image-forming panel 104b.

EXAMPLE 1

A numerically modeled example illustrates how the color-mixed projection system 100 may be used to increase the brightness of a projected image over that produced by a three-panel projection system that has no color-mixing, in other words a projection system like that in FIG. 1 but without the beamsplitter 120 and the beam combiners 124, 126. The first illumination light unit 102a is taken to generate red light, the second illumination light unit 102b is taken to generate green light and the third illumination light unit 102c is taken to generate blue light. The color-mixing beamsplitter 120 used in the color-mixing projection system 100 is a PBS, and transmits light substantially in one polarization state as beam 106b, and light reflects light in substantially the orthogonal polarization state as beam 122.

Figure 4:
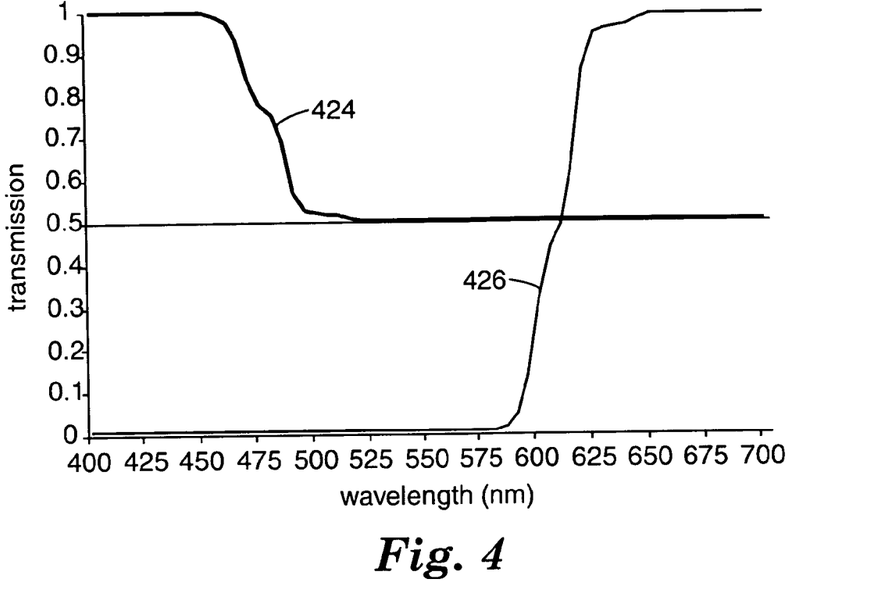
FIG. 4 presents a graph showing the optical transmission of exemplary embodiments of color beam combiners suitable for use in the projection system of FIG. 1, according to principles of the present invention.

The transmission of light through the first and second color beam combiners 124, 126 is illustrated in the graph shown in FIG. 4. Curve 424 shows the transmission through the first color beam combiner 124. The blue light from the illumination light unit 102c is substantially all transmitted through the first color beam combiner 124. The green light beam 122 is approximately 50% transmitted through the first color beam combiner 124, with the remaining 50% being reflected so that beam 107c contains both green and blue light. Curve 426 shows the transmission through the second color beam combiner 126. The red light from the illumination light unit 102a is substantially all transmitted through the second color beam combiner 126. The green light beam 123 is substantially all reflected by the second color beam combiner 126, so that beam 107a contains both green and red light.

Figure 5:
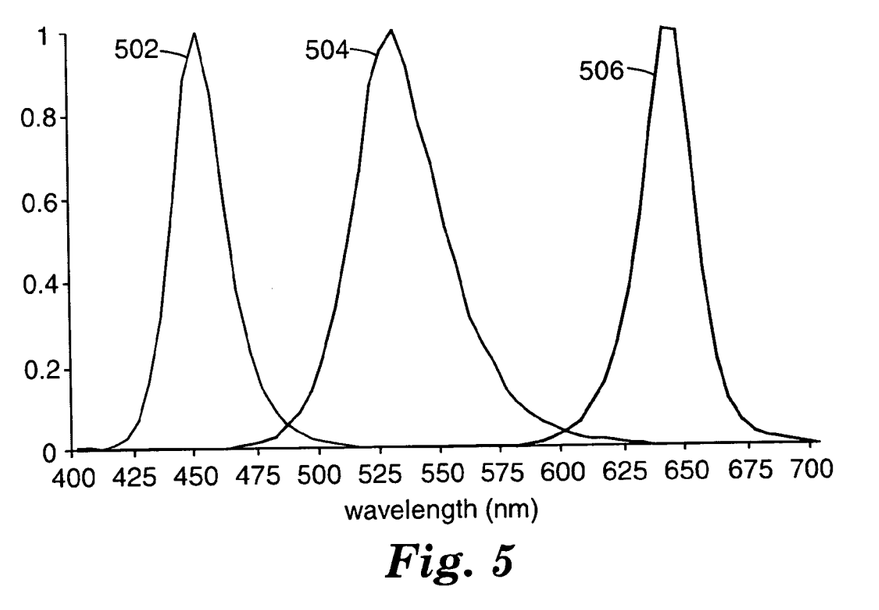
FIG. 5 presents a graph showing spectra of three different primary color beams generated by different LEDs, as used in a model of the projection system of FIG. 1.

The total available light for projecting an image has been calculated for the projection system 100 and for a non-color-mixing, three panel projection system. In each case, it was assumed that the illumination light unit 102a contained an array of nine Luxeon LXHL-PD01 (red) LEDs. The green illumination light unit 102b was assumed to contain an array of nine Luxeon LXHL-PM09 (green) LEDs, and the blue illumination light unit 102c was assumed to contain an array of nine Luxeon LXHL-PR09 (royal blue) LEDs. All the Luxeon LEDs are available from Lumileds Inc., San Jose, Calif. Normalized emission spectra for these three different types of LED are shown in the graph of FIG. 5: curve 502 shows the spectrum of the light emitted by the LXHL-PR09 (royal blue) LED, curve 504 shows the spectrum of the light emitted by the LXHL-PM09 (green) LED and curve 506 shows the spectrum of the light emitted by the LXHL-PD01 (red) LED. The center wavelength for the royal blue light is approximately 455 nm, for the green light is approximately 530 nm and for the red light is approximately 645 nm.

As used herein, the term "primary" refers to the color of the light generated by a light source. Thus, the red, green and royal blue colors are each considered to be primary colors. The colors of the light emitted by the different LEDs may be described using the CIE 1931 (x,y) color coordinate system, as shown in Table I. The lower two rows of the table show the recommended values of the blue, green and red channels for image projection systems according to the document "C Color Colorimetry", Recommended Practices 145-1999, published by the Society of Motion Picture and Television Engineers (SMPTE). This document is referred to hereafter as RP 145-1999.

TABLE I

Color Coordinates of LED light and RP 145-1999 Color Gamut.

|  |  | Royal Blue | Green | Red |
|---|---|---|---|---|
| LED | x | 0.153 | 0.234 | 0.701 |
|  | y | 0.027 | 0.698 | 0.295 |
| RP 145-1999 | x | 0.155 | 0.310 | 0.630 |
|  | y | 0.070 | 0.595 | 0.340 |

Not all of the light emitted by an LED is actually incident at the target image-forming panel. Some of the light that comes out of the LED is emitted after reflection from the mirror substrate incorporated into the LED unit. In the modeling that is described below, this reflected light is disregarded. The useful flux from the LED is the light that directly propagates from the light emitting area of the LED. This used flux was measured for each LED type and the results are shown in the Table II. Furthermore, the geometrical collection efficiency (GCE) of an LED is the ratio of LED light, incident at the imager within a cone angle corresponding to the system's f-number, to the total light coming from the light-emitting area of the LED. The value of GCE depends on the position of the LED within the cluster and on the optical design of the illumination light unit. Table II provides average GCE values for a cluster of LEDs used in an illumination light unit of the type illustrated in FIG. 2. The values of used flux and GCE that were used to calculate the amount of light incident at the image-forming panels is listed in Table II

TABLE II

Used flux and average GCE of individual LEDs.

| Color | Used flux | GCE |
|---|---|---|
| Royal Blue | 0.86 | 0.55 |
| Green | 0.84 | 0.55 |
| Red | 0.57 | 0.6 |

Table III, below, lists characteristics for the un-mixed projection system, when operated with only one primary color incident on each respective image-forming panel. The power of the LEDs in each primary color channel is adjusted so as to achieve a white color, with all three primary colors combined, that has color coordinates of (0.313, 0.329). Thus, in the unmixed projection system, the recommended white color (0.313, 0.329) is achieved using the combined red, green and blue light beams, when the royal blue LEDs in the blue channel are operated at 20.3% power, the green LEDs in the green channel are operated at 100% power and the red LEDS in the red channel are operated at 74% power. As used herein, the term "channel" refers to the light beam incident on a particular image-forming panel. Thus, for example, the term "blue channel" refers to the light incident on the image-forming panel that forms the blue component of the image. The total maximum flux in the white beam is 222.8 lumens, and the flux in the blue, green and red channels to achieve the white color is 7.3 lumens, 167.2 lumens and 48.3 lumens respectively. The calculated levels of lumens discussed herein do not take into consideration such losses as Fresnel reflections, absorption, reflection from the image-forming panels that is less than 100%. These losses, however, are uniform for different illumination configurations, and so are not expected to affect the comparison of one configuration of illumination unit with another.

TABLE III

Projection system with three primaries, three channels and no color mixing.

|  |  | channel | | | |
|---|---|---|---|---|---|
|  |  | Blue | Green | Red | White |
| Used power (%) | RB | 20.3 | | | |
|  | Green | | 100 | | |
|  | Red | | | 74.0 | |
| CIE (x, y) | Δx | −0.003 | −0.071 | 0.075 | 0.000 |
| Deviation | Δy | −0.044 | 0.115 | −0.046 | 0.000 |
| Flux (lumens) |  | 7.3 | 167.2 | 48.3 | 222.8 |

The row labeled "CIE (x,y) deviation" refers to the amount by which the light in the given channel, after passing through the image color combiner unit, differs from the recommended color for that channel according to RP 145-1999.

Figure 6:
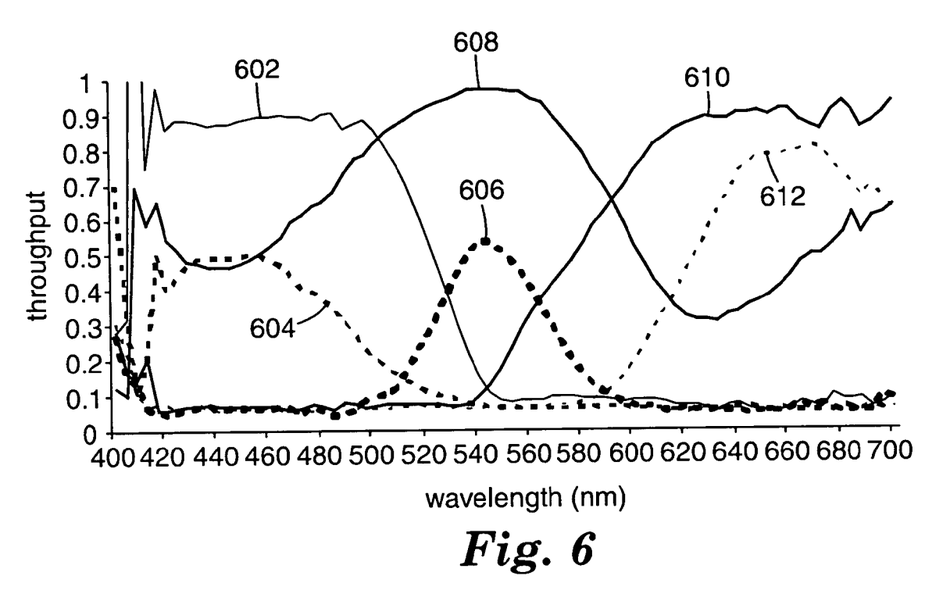
FIG. 6 presents a graph showing throughput as a function of wavelength and polarization for three different channels in an exemplary x-cube image beam combiner.

The white color is calculated for the mixed image beam 118, after the different colored image beams 108a-108c are combined in the image color combiner unit 114. The throughput for light in each channel was measured for a typical x-cube image color combiner, for example as is available from Keting Optical Technology Inc., Hangzhou, P. R. C., and from Prodisc Technology Inc., Taipei Hsein, Taiwan. The term "throughput" means the fraction of light incident at the combiner 114 in a certain color channel that passes out of the combiner 114. The red and blue light were reflected within the combiner 114 and the green light was transmitted through the combiner 114. A graph showing the measured throughput for s-polarized and p-polarized light in each color channel is shown in FIG. 6. Curves 602 and 604 respectively show the throughput for s- and p-polarized light in the blue channel. Curves 606 and 608 respectively show the throughput for the light in the green channel and curves 610 and 612 respectively show the throughput for the light in the red channel. Throughput is highest for s-polarized light in the red and blue channels and for p-polarized light in the green channel. The throughput of the blue channel is minimal for light having a wavelength higher than about 550 nm, whereas the throughput in the red channel is minimal for light having a wavelength less than about 540 nm. The green channel transmits no less than about 30% of the light across the spectrum.

Table IV, below, lists characteristics for the color-mixed projection system 100 when green light, in the polarization state not used by the green image-forming panel, is mixed into the blue and red channels. The table shows the power of the LEDs in each of the illumination light units needed to achieve the desired RP145-1999 white point at maximum illuminance. The royal blue LEDs in the blue channel are operated at 25.1% power, the green LEDs in the green channel are operated at 100% power and the red LEDS in the red channel are operated at 96% power. The total maximum flux in the white beam is 259.4 lumens, which is about 16% higher than for the unmixed projection system, summarized in Table III. Furthermore, the amount of light in the individual blue, green and red channels is higher, and the deviation of the channel colors from the recommended RP 145-1999 values is less, at least for the red and blue channels. Accordingly, mixing some of the green light into the blue and red channels not only increases the overall brightness of the image, the color gamut also becomes closer to that recommended in RP 145-1999.

TABLE IV

Projection system with three primaries, three panels and color mixing between channels

| Channel | | Blue | Green | Red | White |
|---|---|---|---|---|---|
| Used power (%) | RB | 25.1 | | | |
| | Green | 66.0 | 100 | 96.0 | |
| | Red | | | 96.0 | |
| CIE (x, y) | Δx | −0.003 | −0.071 | 0.044 | 0.001 |
| Deviation | Δy | 0.000 | 0.115 | −0.017 | −0.002 |
| Flux (lumens) | | 24.2 | 167.3 | 67.9 | 259.4 |

The above example has a configuration that mixes green light into both the red and blue channels. It will be appreciated that, in other embodiments, the green light may be mixed into only one other primary color beam. Also, other colors may be mixed, for example blue and red light may each be mixed into the green channel using the appropriate optical elements for splitting and combining the beams.

In other exemplary embodiments of projection systems, the number of primary colored beams generated may be greater than the number of image-forming panels. For example, where the projection system includes three image-forming panels, there may be four or more primary illumination beams generated, with light from at least a first of the primary colored beams being combined with at least a second primary colored beam to produce a mixed color beam that is incident on the one of the image-forming panels.

Figure 7:
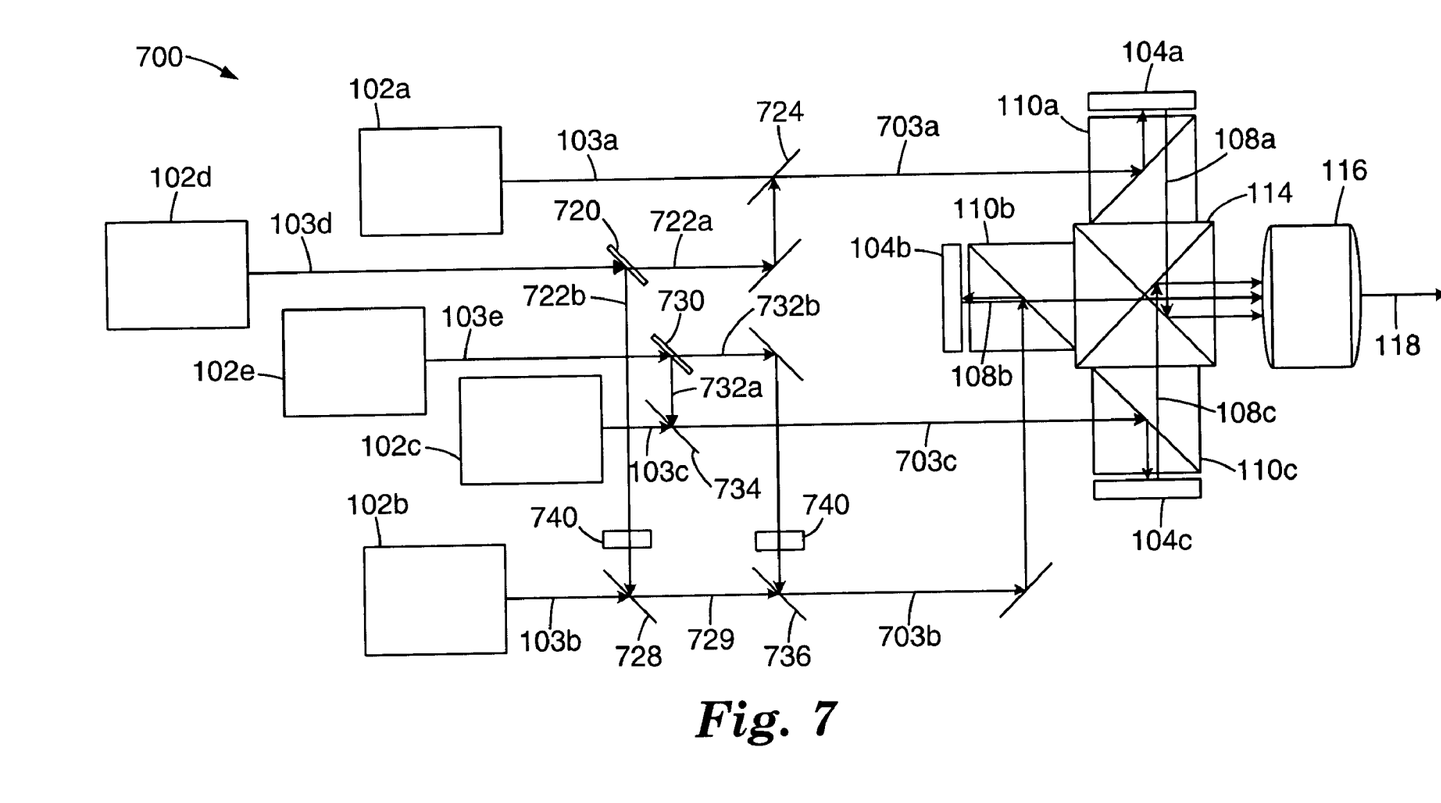
FIG. 7 schematically illustrates an exemplary embodiment of an image projection system, in which more primary colored beams are generated than there are image-forming panels, and beams of primary color light are mixed, according to principles of the present invention.

In one particular exemplary embodiment of a projection system 700, five illumination light units 102a-102e generate five different respective primary color illumination beams 103a-103e. The first three primary beams 103a-103c are transmitted to their respective image-forming panels 104a-104c. The fourth primary beam 103d, however, is incident on a beamsplitter 720, which splits the beam 103d into two fourth primary sub-beams 722a, 722b. Fourth primary sub-beam 722a may be combined with the first primary beam 103a at a first illumination beam combiner 724 to produce a first mixed illumination beam 703a. Fourth primary sub-beam 722b may be combined with the second primary beam 103b at a second illumination beam combiner 728 to produce a second mixed illumination beam 729.

The fifth primary beam 103e may be incident on another beamsplitter 730, which splits the beam 103e into two fifth primary sub-beams 732a, 732b. Fifth primary sub-beam 732a may be combined with the third primary beam 103c at a third illumination beam combiner 734 to produce a third mixed illumination beam 703c. Fourth primary sub-beam 732b may be combined with the beam 729 at a fourth illumination beam combiner 736 to produce a fourth mixed illumination beam 703b. Various mirrors, reflectors etc may be employed to direct beams in desired directions.

In some embodiments, the beamsplitters 720, 730 may simply transmit a specific fraction of the incident light into the two sub-beams 722a, 722b and 732a, 732b respectively. In other embodiments, the beamsplitters 730 may be polarizing beamsplitters, in which case the sub-beams 722a and 722b are substantially orthogonally polarized and sub-beams 732a and 732b are also substantially orthogonally polarized. One or more polarization control elements 740 may be employed to control the polarization state of a particular beam. For example, sub-beams 722b and 732b may optionally each be provided with a polarization control element 740 to control the polarization of the sub-beams 722b, 732b before mixing at the combining elements 728 and 736.

Thus, in a projection system having three image-forming light panels, illumination light beams of more than three primary colors may be generated, with light from at least one of the primary color beams being mixed with light from another primary colored beam before illuminating the image-forming panels. In the illustrated embodiment, illumination beams of five different primary colors are generated and light from two of the primary beams are mixed with the other three primary beams to produce three mixed illumination beams that illuminate the image-forming panels.

EXAMPLE 2

A numerically modeled example illustrates how the color-mixed projection system 700 may be used to increase the brightness of a projected image and to produce a more balanced color gamut. The five primary colors are assumed to be royal blue, cyan, green, amber and red. Table IV lists the colors, the assumed LED model numbers for the LEDS (all produced by Lumileds Inc, San Jose, Calif.) and optical output (lumens) used in the different illumination light units. Each illumination light unit was assumed to use an array of nine LEDs in an arrangement like that illustrated in FIG. 2.

TABLE V

Summary of LED Output Characteristics

| Illumination Light Unit | Color | Model No. | Output (lumens) | Spectrum curve |
|---|---|---|---|---|
| 102a | Red | LXHL-PD01 | 44 | 810 |
| 102b | Green | LXHL-PM09 | 80 | 806 |
| 102c | Royal Blue | LXHL-PR09 | 18 | 802 |
| 102d | Amber | LXHL-PL01 | 36 | 808 |
| 102e | Cyan | LXHL-PE09 | 80 | 804 |

Figure 8:
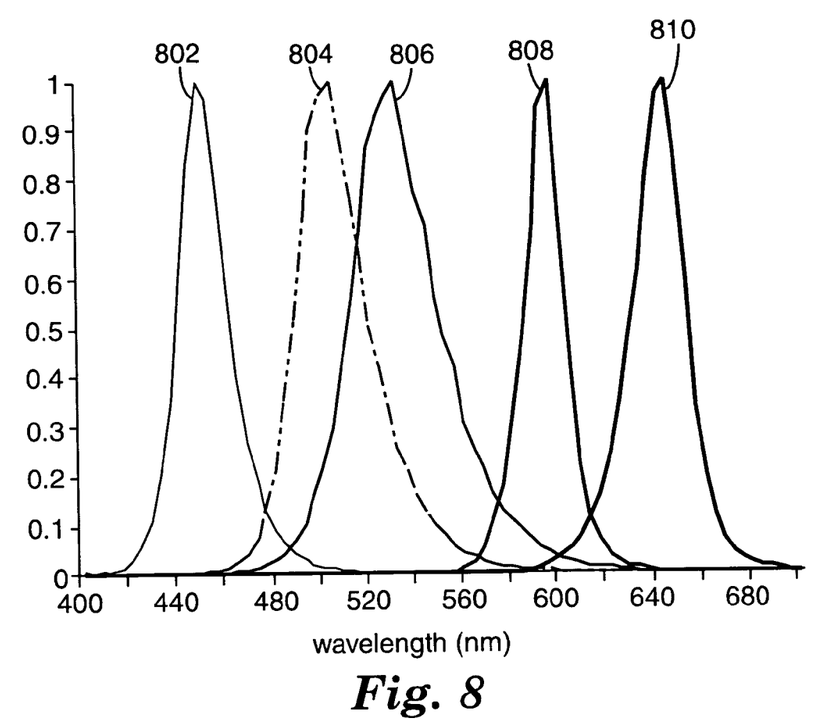
FIG. 8 schematically illustrates a graph showing spectra of five different primary color beams generated by different LEDs, as used in a model of the projection system of FIG. 7.

A graph showing the normalized spectra of the light produced by the different LEDs is presented in FIG. 8. The curves marked on the graph correspond to the different illumination light units as shown in Table V.

The values of used flux and GCE that were used in the calculations are summarized in Table VI.

TABLE VI

Used flux and average GCE of individual LEDs.

| Color | Used flux | GCE |
|---|---|---|
| Royal Blue | 0.86 | 0.55 |
| Cyan | 0.86 | 0.55 |
| Green | 0.84 | 0.55 |
| Amber | 0.57 | 0.6 |
| Red | 0.57 | 0.6 |

Figure 9:
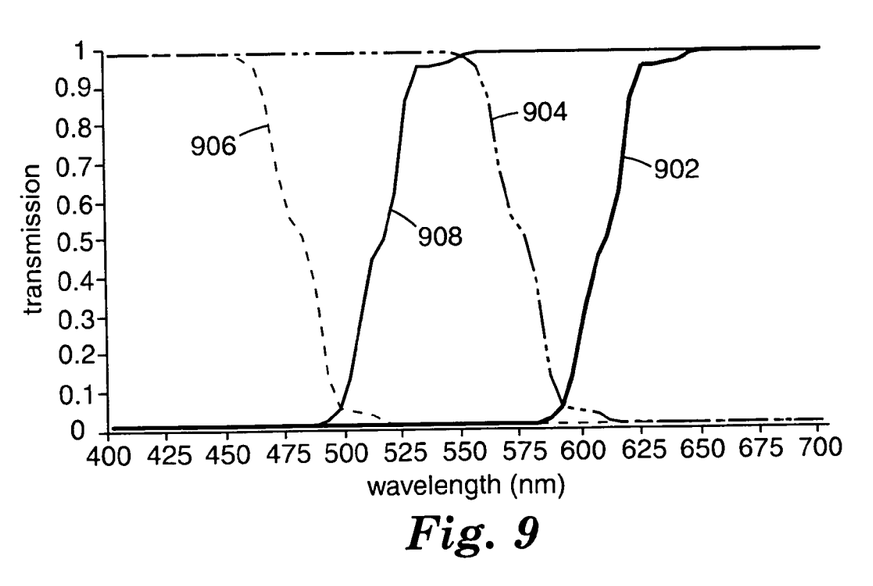
FIG. 9 presents a graph showing the optical transmission of exemplary embodiments of color beam combiners that might be used in the projection system of FIG. 7, according to principles of the present invention.

The beamsplitters 720, 730 were assumed to be PBSs, generating orthogonally polarized sub-beams. The transmission of light through the different illumination beam color combiners that is assumed in the modeling is shown in FIG. 9. Combiner 724, curve 902, reflects amber light and transmits red light. Combiner 728, curve 904, reflects amber light and transmits green light. Combiner 734, curve 906, transmits blue light and reflects cyan light. Combiner 736, curve 908, transmits green light and reflects cyan light. It will be appreciated that the combiners are not perfect transmitters and reflectors, and so when a combiner is described as transmitting or reflecting light, the transmission or reflection need not be 100%.

The operation of the five primary projection system is summarized in Table VII. The values of used power listed for each primary in the three channels, blue, green and red, are the values that produce the highest luminance for the combined white beam with a CIE 1931 color of (0.313, 0.329).

TABLE VII

Three panel projection system with five primaries.

| | | Channel | | | |
| --- | --- | --- | --- | --- | --- |
| | | Blue | Green | Red | White |
| Used power (%) | RB | 27 | | | |
| | Cyan | 27 | 100 | | |
| | Green | | 100 | | |
| | Amber | | 100 | 96 | |
| | Red | | | 96 | |
| CIE (x, y) deviation | Δx | −0.012 | −0.065 | 0.045 | 0.000 |
| | Δy | −0.003 | −0.007 | −0.015 | 0.000 |
| Flux (lumens) | | 25.8 | 233.2 | 85.9 | 344.9 |

The flux in the white beam is 344.9 lumens, which is 55% higher than the flux output by the projection system 100 of FIG. 1. It is noted, however, that there are five LED clusters in the five primary projection system 700, compared with three LED clusters in the projection system 100. Another notable result is that the individual color channels are closer to those in RP 145-1999: the CIE deviations are less than for either projection system 100 or projection system 300.

It will be appreciated that many different variations are available for a projection system in which there are more primary beams than there are image-forming panels. For example, there may be one, two, three or more primary beams in excess of the number of image-forming panels. Also, the specific configuration in which the light from different primary beams is combined may be changed. In some embodiments, for example, a first color may be transmitted through a color combiner while a second color is reflected by the color combiner. In other embodiments, the first color may be reflected by the color combiner while the second color is transmitted by the color combiner. Different configurations of polarization control may also be employed. For example, if light from first and second primaries are combined, there may be polarization control elements in the first primary beam, the second primary beam and/or a combination of the two. This mixing of primary colored light may be desirable in certain embodiments of projection system using multiple image-forming panels, where each image-forming panel is continuously illuminated. This permits the projection system to project bright, color balanced images using the RGB optical control signal that is conventionally used for projection systems, without having to process the control signal for controlling additional primary colors.

Accordingly, the present invention should not be considered limited to the particular examples described above, but rather should be understood to cover all aspects of the invention as fairly set out in the attached claims. Various modifications, equivalent processes, as well as numerous structures to which the present invention may be applicable will be readily apparent to those of skill in the art to which the present invention is directed upon review of the present specification. The claims are intended to cover such modifications and devices.

I claim:

1. An optical system, comprising:
at least a first image-forming panel;
a first illumination light unit source capable of generating a first light beam of a first primary color;
a second illumination light unit light source capable of generating a second light beam of a second primary color different from the first primary color;
a first beamsplitter disposed to split at least a portion of the first light beam into third and fourth beams of the first primary color, the third light beam being directed to the first image-forming panel; and
a first color combiner disposed to combine at least some of the fourth light beam with at least some of the light of the second light beam to form a fifth channel of mixed light of the first and second primary colors.

2. A system as recited in claim 1, further comprising a second image-forming panel, the second image-forming panel being illuminated with light from the fifth channel.

3. A system as recited in claim 2, further comprising a third image-forming panel and a third illumination light unit capable of generating light of a third primary color, different from the first and second primary colors, in a sixth light beam, at least some of the light in the third primary color illuminating the third image-forming panel.

4. A system as recited in claim 3, further comprising a second color combiner, at least some of the light from one of the first, third and fourth light beams being combined with at least some of the light in the sixth light beam to form a seventh channel of mixed light of the first and third primary colors, at least some of the light of the seventh channel beam illuminating the third image-forming panel.

5. A system as recited in claim 1, wherein the beamsplitter is a polarization beamsplitter, the polarization of the light in the third light beam being orthogonal to the polarization of the light of the fourth light beam.

6. A system as recited in claim 5, further comprising a polarization rotation element disposed in at least one of the third and fourth light beams to rotate the polarization of the one of the third and fourth light beams.

7. A system as recited in claim 1, wherein the beamsplitter is a partially reflecting beamsplitter.

8. A system as recited in claim 7, wherein the partially reflecting beamsplitter is one of a metalized beamsplitter and a dielectric-layered beamsplitter.

9. A system as recited in claim 1, wherein the first image-forming panel is a liquid crystal image-forming panel.

10. A system as recited in claim 9, wherein the liquid crystal image-forming panel is a reflective image-forming panel.

11. A system as recited in claim 9, wherein the liquid crystal image-forming panel is a transmissive image-forming panel.

12. A system as recited in claim 1, wherein the first primary color is green and the second primary color is one of red and blue.

13. A system as recited in claim 1, further comprising at least a second image-forming panel, an image color combiner disposed to combine images from the first and at least a second image-forming panels to form a full color image beam.

14. A system as recited in claim 13, further comprising a projection lens unit and a projection screen, the projection lens unit being disposed to project the full color image beam to the projection screen.

15. A system as recited in claim 13, further comprising a controller coupled to direct image control information to the first and at least a second image-forming panels.

16. A system as recited in claim 1, wherein the first and second illumination light units each comprise an array of light sources capable of generating the first and second primary colors respectively, and light collecting optical elements to collect the light emitted by the light sources.

17. A system as recited in claim 16, wherein at least some of the light sources are light emitting diodes.

18. A projection system, comprising:
a first illumination light unit capable of generating light of a first primary color;
a first image-forming panel illuminated by at least some of the light of the first primary color;
a second illumination light unit capable of generating light of a second primary color;
a second image-forming panel illuminated by at least some of the light of the second primary color;
a third illumination light unit capable of generating light of a third primary color;
a third image-forming panel illuminated by at least some of the light of the third primary color;
a color separating unit arranged to separate at least some of the light of the second primary color as a separated beam; and
a color mixing unit arranged to mix the separated beam with at least one of the light of the first primary color and the light of the third primary color to produce a fourth channel;
wherein at least one of the first and third image-forming panels is illuminated by light of the fourth channel.

19. A system as recited in claim 18, wherein the color mixing unit comprises at least a first color combiner to combine at least some of the light of the second primary color with at least some of the light of the first primary color and a second color combiner to combine at least some of the light of the second primary color with at least some of the light of the third primary color.

20. A system as recited in claim 18, further comprising an image color combiner disposed to combine image light from the first, second and third image-forming panels to form a full color image beam, a projection lens unit disposed to project the full color image beam, and a projection screen on which the full color image beam is projected by the projection lens unit.

21. A projection system, comprising:
a first illumination light wait capable of generating light of a first primary color;
a first image-forming panel;
a second illumination light unit capable of generating light of a second primary color;
a second image-forming panel at least some of the light of the second primary color illuminating the second image-forming panel;
a third illumination light unit capable of generating light of a third primary color;
a first light splitting unit that splits at least some of the light of the third primary color into first and second beams of the third primary color; and
a first color mixing unit that combines at least some of the light of the first primary color and at least some of the light of the first beam of the third primary color to form a first mixed primary light beam, the first mixed primary light beam being directed to the first image-forming panel.

22. A system as recited in claim 21, further comprising a second color mixing unit that combines at least some of the light of the second primary color and at least some of the light of the second beam of the third primary color to form a second mixed primary light beam, the second mixed primary light beam being directed to the second image-forming panel.

23. A system as recited in claim 21, further comprising an image beam mixing unit, image light from the first and second image-forming panels being combined in the image beam mixing unit to form a mixed image beam.

24. A system as recited in claim 23, further comprising a projection lens unit and a projection screen, the projection lens unit being disposed to project the mixed image beam from the image beam mixing unit top the projection screen.

25. A system as recited in claim 23, wherein the image beam mixing unit comprises an x-cube color combiner.

26. A system as recited in claim 21, wherein the first light splitting unit is a polarization beamsplitter.

27. A system as recited in claim 26, further comprising a polarization rotation element disposed in at least one of the first and second beams of the third primary color.

28. A system as recited in claim 21, wherein the first light splitting unit is a partially reflecting beamsplitter.

29. A system as recited in claim 21, wherein the first and second image-forming panels are liquid crystal image-forming panels.

30. A system as recited in claim 29, wherein the liquid crystal image-forming panels comprise reflective image-forming panels.

31. A system as recited in claim 29, wherein the liquid crystal image-forming panels are transmissive image-forming panels.

32. A system as recited in claim 21, wherein the first primary color is green, having a first center wavelength, the second primary color is one of red and blue, having a second center wavelength, and the third primary color has a third center wavelength between the first and second center wavelengths.

33. A system as recited in claim 21, further comprising a controller coupled to direct image control information to the first and second image-forming panels.

34. A system as recited in claim 21, wherein the first and second illumination light units each comprise an array of light sources capable of generating the first and second primary colors respectively, and also each comprise light collecting optical elements to collect the light emitted by the light sources.

35. A system as recited in claim 34, wherein at least some of the light sources are light emitting diodes.

* * * * *

UNITED STATES PATENT AND TRADEMARK OFFICE
CERTIFICATE OF CORRECTION

PATENT NO. : 7,410,261 B2 Page 1 of 1
APPLICATION NO. : 11/133816
DATED : August 12, 2008
INVENTOR(S) : Simon Magarill

It is certified that error appears in the above-identified patent and that said Letters Patent is hereby corrected as shown below:

Column 12
Line 28, in Claim 4, after "channel" delete "beam".

Column 13
Line 44, in Claim 21, delete "wait" and insert -- unit --, therefor.

Signed and Sealed this

Fourth Day of November, 2008

JON W. DUDAS
*Director of the United States Patent and Trademark Office*